2,886,695
APPARATUS FOR DISPENSING A POWDER COATING TO WELDING WIRE

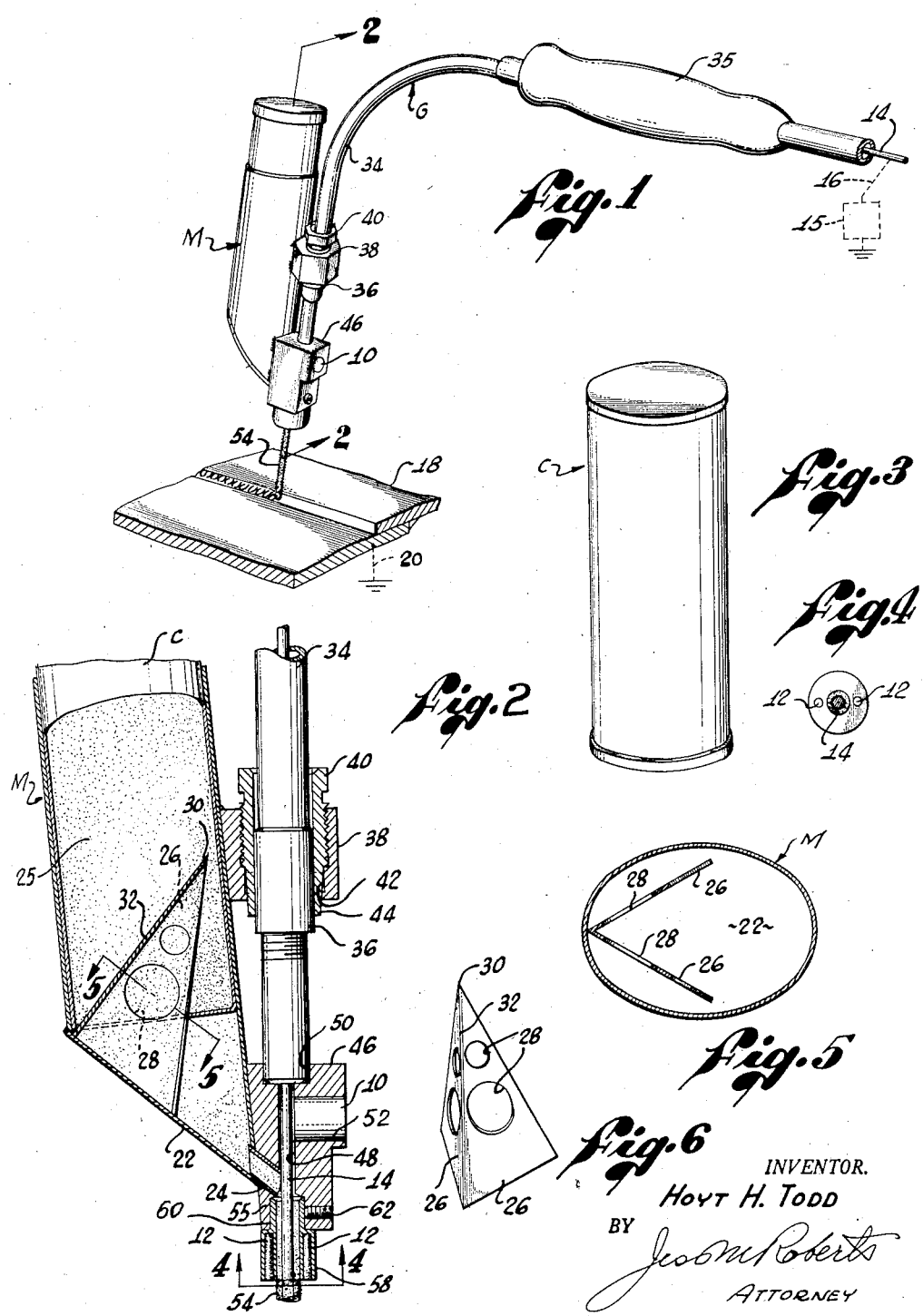

Hoyt H. Todd, Whittier, Calif., assignor to Western Carbide Corporation, North Hollywood, Calif., a corporation of California Application December 17, 1956, Serial No. 628,580

10 Claims. (Cl. 219—130)

This invention relates to a welding apparatus in which magnetically responsive welding powder is fed to a traveling welding wire for the formation of a powder coating thereon by magnetic attraction.

The powder commonly used for this purpose in arc welding includes alloy additives, arc stabilizers and fluxing agents to result in a highly stable welding arc and a high rate of deposit of the weld metal. Such a procedure of coating the welding wire as it is used in especially advantageous because various powder compositions may be used at will for various specific purposes without the necessity of carrying in stock a number of differently coated welding wires.

The heretofore most widely used arc welding apparatus that dispenses ferromagnetic powder composition onto a traveling welding wire employs a hopper with a bottom outlet. The hopper holds a supply of the ferromagnetic powder and is provided with a pair of magnets that straddle the bottom outlet of the hopper to magnetize the powder in the immediate region of the outlet and thereby prevent gravitational escape of the powder through the outlet. Welding wire is fed into the hopper from above and out through the bottom outlet and the electric current through the wire sets up a magnetic field to attract the ferromagnetic material to the wire to form the powdered coating thereon.

Such a prior art apparatus has certain disadvantages that have limited the application of this technique to welding purposes. One disadvantage is that there is a certain critical relationship between the magnetic responsiveness of the powder and the strength of the two permanent magnets that are used to prevent escape of the powder from the hopper. In many instances, it is desirable to use a welding powder of this type that has an unusually high iron content to produce certain alloying effects. The high iron content makes the powder so highly magnetically responsive that the powder is immobilized at the hopper outlet by the magnetic field of the current flowing through the welding wire. With the powder immobilized at the hopper outlet, the welding wire merely slides through the powder without picking up the desired powder coating.

Another disadvantage that is always encountered in the use of such an apparatus is that the metal powder does not adhere to the welding wire unless current is flowing through the wire to provide the required magnetic field for attracting the powder to the wire. When the welding current is cut off at the end of a welding operation, the powder coating drops off the wire, and when welding is resumed, a portion of bare wire must be consumed before a new coating of powder reaches the arc zone.

A third disadvantage is that a relatively large hopper is used that is awkward and heavy for manual welding operations. It takes time to fill the hopper by hand and a large hopper defers the necessity for taking time out for filling the hopper. Another reason for making the hopper large is that stopping to refill the hopper requires cutting off the welding current with consequent loss of the powder coating on the wire and consequent loss of time in resuming the welding operation.

The broad object of the present invention is to avoid all of these disadvantages that characterize the described prior art procedure. Generally described, this broad object is attained, in part, by shielding the supply of ferromagnetic powder from the magnetic field of the charged welding wire, in part, by providing means independent of the welding current to cause the coating of powder to adhere to the wire, and, in part, by employing cartridges or disposable containers to replenish the supply of welding powder.

The shielding of the ferromagnetic powder from the magnetic field of the welding wire is accomplished by interposing a wall of ferromagnetic material between the supply of powder and the welding wire. Preferably, the welding wire is positioned completely outside of the hopper instead of inside the hopper and at least the portion of the hopper on the side adjacent the welding wire is made of ferromagnetic material to function as a magnetic shield. The hopper tapers down to a dispensing outlet that is directed towards the periphery of the traveling welding wire at close spacing relative thereto, the spacing being approximately the desired thickness of the powder coating on the wire. It has been discovered that the powder may be fed to the traveling welding wire from one side since the magnetically attracted powder particles tend to distribute themselves uniformly around the circumference of the wire.

The means independent of the welding current to cause the magnetically responsive powder to be attracted to the welding wire comprises a permanent magnet means which touches or at least nearly touches the welding wire and thereby magnetizes the wire to the extent required for attracting the metal particles for the wire coating. The present invention teaches the use of a permanent magnet positioned adjacent the traveling wire but above the point where the powder is dispensed to the peripheral surface of the wire. At this higher location, the contact of the permanent magnet with the wire does not interfere with the powder coating.

The use of disposable containers of powder for replenishing the powder supply eliminates the necessity of pouring the powder into a supply container such as a hopper. In this regard, a feature of the invention is the concept of employing frangible containers such as paper containers and providing the apparatus with built-in means to puncture the frangible containers for the release of the powder therefrom. When the powder supply in the manually supported welding means runs low, it is merely necessary to install a new cartridge by a simple hand movement with substantially no loss of time. In this way, it becomes a practical matter to use realtively small supply containers, such as containers only large enough to hold one pound of welding powder, so that the hand-held apparatus is burdened by the weight of only a relatively small quantity of the welding powder. Thus, the manually supported apparatus may be relatively small and relatively light to make possible long periods of sustained manual welding without undue fatigue.

The path of the traveling wire is determined by a wire guide which is provided at its exit end with a passage that is of larger diameter than the wire and it is in this passage that the powder is fed to the wire to form the coating thereon. One feature of the invention in this regard is the provision of a second magnet means to create magnetic flux across this passage for the purpose of preventing the supply of powder from escaping through this passage by gravity. This second magnet means may comprise a pair of small bar magnets straddling the passage and parallel to the passage.

Another feature of the wire guide in the preferred practice of the invention is the use of a removable tip that forms the passage means. Thus, the invention permits the use of a series of interchangeable tips for use with wires of different diameters and to permit coatings of different diameters to be applied to a wire of a given diameter. A further feature of the preferred practice of the invention is the use of an aluminum tip member having an anodized surface. It has been found that there is relatively little tendency for splattered metal to stick tenaciously to an aluminum oxide surface. Thus, the provision of such a surface greatly increases the service life of a replaceable tip for the wire guide.

While the invention has special utility in electric arc welding, it is also applicable to gas welding techniques.

The features and advantages of the invention may be understood from the following detailed description considered with the accompanying drawings.

In the drawings, which are to be regarded as merely illustrative:

Fig. 1 is a perspective view of the presently preferred embodiment of the invention;

Fig. 2 is an enlarged longitudinal sectional view taken as indicated by the line 2—2 of Fig. 1;

Fig. 3 is a perspective view of a disposable container for the magnetically responsive powder that is used in the preferred practice of the invention;

Fig. 4 is an end view of the replaceable tip as seen along the line 4—4 of Fig. 2;

Fig. 5 is a fragmentary section taken along the line 5—5 of Fig. 2 to show the construction of the means for rupturing the disposable powder containers; and Fig. 6 is a perspective view of the container-rupturing means.

The principal parts of the preferred embodiment of the invention shown in the drawings include a guide means generally designated G; a magazine generally designated M to hold a supply of the magnetically responsive powder; a first magnet means in the form of a permanent magnet 10 to magnetize the traveling wire; and a second magnet means in the form of a pair of small bar magnets 12 (Figs. 2 and 4) that prevent gravitational escape of the powder supply. A welding wire 14 is advanced as needed through the wire guide, and, for this purpose, automatic means (not shown) may be provided in a well known manner to feed the wire in accord with the rate at which the wire is consumed in the welding operation.

A suitable grounded electromotive source 15 is electrically connected with the welding wire 14, as indicated by the dotted line 16, and the base metal 18 that is to be welded is grounded, as indicated by the dotted line 20, to complete the circuit. If the invention is employed for arc welding, the electromotive source 15 supplies a relatively heavy current, but, if the invention is employed for gas welding, only sufficient current is used as required to cause the magnetically responsive powder to adhere to the highly heated end portion of the wire. If the wire is not heated, the end portion of the wire is adequately magnetized by the permanent magnet 10 for maintaining the powder coating, but, of course, the wire loses its magnetism when it is highly heated, and, at such time the required magnetism is supplied by the electric current.

A feature of the invention is that the magazine M is positioned to one side of the wire guide G and that the supply of powder in the magazine is magnetically shielded from the magnetic effect of the current through the welding wire. The important fact is that the powder supply is magnetically shielded, and, with adequate shielding, a wire could be guided through the magazine. Placing the wire guide outside of the magazine simplifies the problem of magnetically shielding the powder.

Any suitable arrangement may be provided for magnetically shielding the supply of powder in the magazine M, but in this particular practice of the invention, the magnetic shielding is accomplished simply by using ferromagnetic material for the magazine. Thus, the magazine M is in the form of a steel cylinder having an inclined bottom 22 to cause the powder to gravitate to a dispensing outlet 24. The dispensing outlet 24 may be in the form of a small, short tube of ferromagnetic material such as mild steel, the tube being positioned as shown in Fig. 2. Thus, the magnetically responsive powder 25 is completely shielded against magnetism until it reaches the region immediately adjacent the traveling wire.

Preferably, but not necessarily, the magazine M is adapted for use with a disposable container generally designated C, the magazine M serving as a holder for such a removable container. The container C is made of material that is frangible or at least easily rupturable, and, for this purpose, the container may be a cylindrical paper cartridge, as best shown in Fig. 3, the cartridge being dimensioned to slide freely into the magazine M to the position shown in Fig. 2.

In this particular embodiment of the invention, the magazine M is provided with suitable means to rupture the container C when the container is forced into the magazine. For this purpose, a pair of triangular blades 26 having suitable apertures 28 therein may be fixedly mounted on the inclined bottom 22 of the magazine, as shown in Figs. 2 and 5. The two blades 26 are united edge-to-edge to form an upwardly directed point 30 and an upwardly directed edge 32. It is apparent that, when a paper container C is forced into the magazine M, the bottom of the paper container will be ruptured and the ruptured portions of the container bottom will be spread apart. It can be seen in Fig. 2 that the powder may flow freely through the apertures 28 into the inclined bottom region of the magazine.

The guide means G includes a suitable curved tube 34 which may be made of copper and which may be provided with a suitable handle 35. In the construction shown, the tube 34 is made in two sections connected by a coupling 36 and the magazine M is bonded to a locknut assembly that effectively grips the coupling 36. The locknut assembly comprises an outer body 38 that is welded or brazed to the magazine M and an inner bushing 40 that threads into the outer body. The outer body 38 has a slight restriction 42 at its lower end and the bushing 40 has a tapered lower end portion 44 that wedges into the restriction, this tapered portion being split to contract into firm engagement with the coupling 36.

Also bonded to the magazine M, for example, by brazing or welding, is a body 46 of nonmagnetic material, preferably stainless steel, which constitutes an extension of the guide means G. The body 46 has a guide bore 48 for the wire 14 and has a counterbore 50 to seat the end of the curved guide tube 34. It is apparent that the magazine M and the two bodies 38 and 36 form a single united structure which may be released from the guide tube 34 by loosening of the bushing 40.

The nonmagnetic body 46 has a relatively large lateral bore 52 to retain the permanent magnet 10 with the permanent magnet extending slightly into the guide bore 48 for close proximity, if not close contact, with the wire 14 for magnetization of the wire. The magnetized wire attracts the powder particles supplied by the magazine M to form a powder coating 54 on the traveling wire as the wire issues from the wire guide. For the purpose of permitting the powder to form the coating, the exit end of the wire guide G is provided with a passage 55 of the desired diameter of the coating and the dispensing outlet 24 delivers the powder to the upper end of this passage. As heretofore stated, a second magnet means in the form of the two small bar magnets 12 creates flux across the passage 55 to prevent gravitational escape of powder from the magazine 25 through the passage.

In the present embodiment of the invention, what may be termed a tip or tip fitting 58 is releasably mounted on the end of the body 46 to serve as the exit end of the guide means G and this tip forms the passage 55, as may be seen in Fig. 2. In the construction shown, the tip 58 has an inner end 60 of reduced diameter that removably extends into the body 46 for releasable engagement by a setscrew 62. The two small bar magnets 12 are in the tip 58 parallel to the passage 55 and straddling the passage.

The manner in which the invention serves its purpose may be readily understood from the foregoing description. If the apparatus is employed for arc welding, the magnetization of the welding wire 14 by the permanent magnet 10 will cause the magnetically responsive powder to adhere to the wire and to form the coating 54 on the wire as the wire is advanced from the tip 58 of the wire guide G. The magnetic flux across the passage 55 created by the pair of small magnets 12 prevents gravitational flow of the powder through the passage, but, nevertheless, permits the powder to cling to the traveling wire and to travel with the wire. The powder flows freely in the magazine M and through the dispensing outlet 24 into the passage 55 because the ferromagnetic material that forms the magazine and the dispensing outlet effectively shields the powder from any external magnetic field including the magnetic field that is created by the flow of welding current through the wire. Whenever the supply of the powder drops low in the magazine M, the empty container C is removed and replaced by a full container. The movement of the full container into the magazine M results in the container being ruptured by the pair of blades 26. Thus, the supply of powder in the magazine may be replenished with ease and with no loss of time. Whenever desired, the set screw 62 may be loosened to permit replacement of the tip 58.

If the apparatus is used for gas welding, only relatively light current will be passed through the welding wire and the base metal, but, in all other respects, the apparatus will function in substantially the same manner as in arc welding.

My description in specific detail of the presently preferred practice of the invention will suggest to those skilled in the art various changes, substitutions and other departures from my disclosure that come within the spirit and scope of the appended claims.

I claim as my invention:

1. In an apparatus for coating a welding wire with magnetically responsive powder for a welding operation, the combination of: means to guide the welding wire along a predetermined path of travel towards a welding zone; a magazine spaced laterally away from the path of the wire to hold a supply of powder for coating the traveling wire, said magazine having a lower dispensing outlet adjacent the path of the wire to deliver the powder to the periphery of the wire for the formation of the powder coating thereon; and magnet means outside the magazine and adjacent the wire to magnetize the wire to cause the formation of said coating thereon by magnetic adherence of the particles from said dispensing outlet, the interior of the magazine being shielded from the flux of said outside magnet for free-flow of the powder to said dispensing outlet.

2. An apparatus as set forth in claim 1, in which said magnetic means is positioned to touch the wire and is positioned above said dispensing outlet with respect to the direction of travel of the wire to avoid interference with the coating.

3. An apparatus as set forth in claim 2, in which said magnetizing means is a permanent magnet.

4. An apparatus as set forth in claim 1, in which said guide means, magazine and magnet means are interconnected to form a unit to be supported by one hand; and in which said magazine comprises a holder together with a disposable container for the powder removably mounted in the holder, said holder being provided with said dispensing outlet.

5. An apparatus as set forth in claim 4, in which said holder is provided with means to puncture the disposable container for the release of the powder therefrom when the container is inserted into the holder.

6. An apparatus as set forth in claim 5, in which said container is made of paper.

7. An apparatus as set forth in claim 5, in which said puncture means has divergent webs meeting at a common edge and a common point at an end of said edge, said webs being apertured to permit the powder to flow therethrough.

8. An apparatus as set forth in claim 1, in which said magazine is made of ferromagnetic material for magnetic shielding of the powder therein from the magnetic field created by current flow through the wire.

9. In an apparatus for coating a welding wire with magnetically responsive powder for a welding operation, the combination of: means to guide the welding wire along a predetermined path towards a welding zone; removable tip means included in said guide means at the exit end thereof and forming a passage around the traveling wire of larger diameter than the wire, said tip means being made of aluminum and having an outer surface of aluminum oxide to reduce the tendency of splattered metal to adhere thereto; and means to supply said powder to said passage.

10. In a device to be supported by hand for coating a welding wire with magnetically responsive powder for a manual welding operation, which device includes means to guide the welding wire along a predetermined path of travel towards a welding zone, and a magazine to hold a supply of the powder for coating the traveling wire, the improvement for minimizing the weight of the device and minimizing the time lost for recharging the magazine, comprising: a plurality of disposable frangible containers holding quantities of the magnetically responsive powder, each dimensioned to slip into said magazine; and means carried by the magazine to puncture said containers for release of the powder therein to the magazine, whereby the weight of the device may be kept low by using a succession of relatively small containers in the course of a welding operation and a new container may be installed in the magazine and the powder released therefrom by merely inserting the new container into the magazine with consequent puncture of the container.

References Cited in the file of this patent

UNITED STATES PATENTS

| | | |
|---|---|---|
| 1,316,122 | Vall | Sept. 16, 1919 |
| 2,093,821 | Southgate | Sept. 21, 1937 |
| 2,655,286 | Barbaro | Oct. 13, 1953 |
| 2,767,302 | Brashear | Oct. 16, 1956 |
| 2,810,063 | Brashear | Oct. 15, 1957 |

FOREIGN PATENTS

| | | |
|---|---|---|
| 394,773 | Great Britain | July 6, 1933 |